_United States Patent_ [19]

Bauer et al.

[11] 4,023,976

[45] May 17, 1977

[54] MANUFACTURE OF GLASS USING BRIQUETTES

[75] Inventors: William C. Bauer, Boulder, Colo.; Richard Irving Howard, deceased, late of Pocatello, Idaho, by Kate Johnson Howard, executrix

[73] Assignee: FMC Corporation, Philadelphia, Pa.

[22] Filed: Jan. 23, 1976

[21] Appl. No.: 651,941

[52] U.S. Cl. .................................. 106/52; 65/27; 65/134; 106/DIG. 8; 264/117; 264/118

[51] Int. Cl.$^2$ ................ C03C 3/04; C03B 5/16; C09C 1/56

[58] Field of Search .......... 65/27, 134; 106/DIG. 8, 106/52; 264/118, 117

[56] References Cited

UNITED STATES PATENTS

| | | | |
|---|---|---|---|
| 2,114,545 | 4/1938 | Slayter | 65/134 |
| 2,578,110 | 12/1951 | Tooley | 65/134 |
| 3,082,102 | 3/1963 | Cole et al. | 106/52 |
| 3,185,554 | 5/1965 | Sweo et al. | 65/17 |
| 3,542,534 | 11/1970 | Yamamoto | 65/27 |
| 3,607,190 | 9/1971 | Penbertny | 65/134 |
| 3,682,666 | 8/1972 | Lacourrege | 106/52 |
| 3,726,697 | 4/1973 | Mod et al. | 65/27 X |
| 3,728,094 | 4/1973 | Bowman | 65/27 |
| 3,753,743 | 8/1973 | Kukuda et al. | 106/52 |
| 3,760,051 | 9/1973 | Eirich et al. | 264/117 |
| 3,767,751 | 10/1973 | Simmingskold et al. | 264/117 |
| 3,788,832 | 1/1974 | Nesbitt et al. | 65/27 X |
| 3,875,282 | 4/1975 | Stenreich | 264/118 |
| 3,880,639 | 4/1975 | Bodner et al. | 65/134 |
| 3,883,364 | 5/1975 | Robertson et al. | 106/DIG. 8 |
| 3,914,364 | 10/1975 | Engelleitner et al. | 65/27 X |
| 3,924,030 | 12/1975 | Tatara et al. | 65/27 X |
| 3,931,036 | 1/1976 | Pierce | 264/118 |
| 3,941,574 | 3/1976 | Melkonian et al. | 106/DIG. 8 |

OTHER PUBLICATIONS

Manring; W. H., "Discussion of Influence on Furnace Atmosphere on the Melting–Fining Rate of Soda Lime Glasses", Canadian Clay and Ceramics, Feb. 1973.

Manring; W. H. and W. C. Bauer, "The Batch Preparation Process–Past, Present and Future", The American Ceramic Society Bulletin, vol. 52, Aug. 1973.

_Primary Examiner_—S. Leon Bashore
_Assistant Examiner_—Frank W. Miga
_Attorney, Agent, or Firm_—Frank Ianno; Eugene G. Seems; Pauline Newman

[57] ABSTRACT

An improved process is described for producing glass in which a glass batch is mixed with a binder, aged, compacted, and compressed into briquettes, which are heated to partially react the contents of the batch in a prereaction stage. Prereacted briquettes are then placed in a fuel-fired furnace and heated at a temperature not above 2,600° F (1,430° C) to refine them into glass.

22 Claims, No Drawings

MANUFACTURE OF GLASS USING BRIQUETTES

In the conventional process for producing glass, a glass batch containing the constituents of the glass is mixed together and melted to form a molten glass. The conversion of the glass batch into its molten form presents many difficulties due to the extremely slow rate at which the constituents of the glass batch melt or dissolve, particularly sand. In the most common method for feeding the glass batch to the glass furnace the constituents of the batch, which in the case of a soda-lime type glass would be primarily sand, soda ash and lime or limestone, are fed as a dry mixture into the furnace and heated until melted. This feeding of the glass batch in the form of a dry mix also presents difficulties due to the segregation of various components of the batch if they are not within certain size ranges relative to each other. A technique to overcome this segregation and non-uniformity of the glass batch is to feed the batch in as a wet, tacky mixture (wet batch). This reduces segregation because the wet ingredients do not have the same mobility in the batch as they do when dry. The wet batch increases the melting rate of the glass batch somewhat. However, handling of the wet batch is difficult since it is not free flowing, and the furnace heating requirements are increased since some heat must be employed to evaporate the water introduced into the furnace as part of the wet batch.

The rate of melting of the glass batch is important because it limits the rate at which glass can be removed from a furnace; this is termed the "pull rate" of the furnace. A decade ago the operator of a glass furnace had pull rates of from 4.0 to 6.0 square feet of melter area per ton of glass per day; today pull rates of 2.0 to 3.0 square feet of melter area per ton of glass per day are common. In order to obtain these higher pull rates and to produce glass of acceptable quality, higher furnace temperatures have had to be employed. Such higher furnace temperatures sufficiently increase melting rates of the glass batch to enable these high pull rates to be maintained with satisfactory glass quality. For example, present glass furnaces must operate at temperatures of between 2,700° F and 2,900° F (1,480° C to 1,590° C), and generally at the upper portion of this range, in order to maintain satisfactory glass quality at these high pull rates.

Unfortunately, this high temperature operation of glass furnaces is undesirable from a number of viewpoints. Initially, operation at these temperatures substantially decreases the life of the refractory brick which is used to line the glass furnace. At these temperatures, which are rapidly approaching the temperature at which the refractory brick begins to lose its structural integrity, the life of the refractory brick is substantially decreased. For example, it has been reported that at these temperatures an increase of merely 50° F will decrease the life of the refractory brick by about 50%. See "Glass Technology", Volume 6, 1965, p. 14.

Another disadvantage of operating at these higher temperatures is the inefficiency of fuel employed to heat the glass furnace. Such higher temperatures require a disproportionately large amount of fuel. This is due to higher heat losses at the higher temperatures and the difficulty of recovering major proportions of this increased amount of heat in either regenerators or other heat exchange means that preheat the incoming air to the furnace.

A further difficulty with such high temperature operation is the increase in pollution it generates. As increased temperatures are encountered, the pollution rate increases substantially due to the greater evolution of volatilized sodium values from the surface of the molten glass as well as increased nitrogen oxides formation. This is undesirable because such values emanating from the furnace not only pollute the air, but sodium values tend to precipitate in heat exchangers, e.g., regenerator brickworks, which are used to recover the heat of the exiting gas stream so that the recovered heat can be used to preheat incoming air to the furnace required for combustion of fuel. These sodium values which precipitate in the regenerator brickworks, whether they be in the form of sodium sulfate or sodium bisulfate or other sodium salts, tend to plug the regenerators and prevent the proper flow of the hot gas stream from the furnace through such regenerators to heat same, or the proper flow of air through the regenerators in order that the air be preheated before entering the furnace.

It has now been found that these difficulties can be avoided by the present process for producing partially reacted, strong, shock-resistant briquetted shapes, suitable as a glass batch feed to a glass furnace comprising:

a. adding to a glass batch a binder selected from the group consisting of water and an aqueous caustic soda solution, in amounts up to 10% by weight, b. aging the glass batch and binder for a period of at least 10 minutes, c. compacting the glass batch and binder in a prebriquetting stage, d. dividing the compacted glass batch and binder into particulate form, e. briquetting the particulates of glass batch and binder into discrete briquetted shapes, f. heating the briquetted shapes to temperatures of from about 750° C to about 900° C for a time sufficient to obtain substantial conversion of silicon dioxide values in the glass batch to silicates, and g. recovering a partially reacted, strong, shockresistant briquetted shape.

It has further been found that when these briquetted shapes produced as set forth above are introduced into a glass furnace at a temperature not above 2,600° F (1,430° C), and preferably 2,400° to 2,600° F (1,315° C to 1,430° C), that volatilization of sodium values from the glass furnace is reduced and that refined molten glass can be recovered from the furnace at acceptable pull rates.

In the following description of the invention and conditions of operation reference will be made to soda-lime glass to illustrate a typical procedure for carrying out the present invention. However, it is to be understood that the following invention can be practiced not only with soda-lime glass, but also with other types of glasses, such as alkali silicates, borosilicate glasses, and lead glasses. The major difference in practicing with these other glasses as compared with the typical soda-lime glass is that the silicon dioxide values of the soda-lime batch are converted to various sodium silicates, e.g., sodium metasilicate, during heat treatment of the briquette shapes described above, whereas in the case of these other glasses other silicates are formed. For example, in the case of borosilicate glass a borosilicate is formed, whereas in the case of a lead glass an alkali lead silicate is formed.

In carrying out the present invention the glass batch, e.g., a typical soda-lime glass batch containing sand, soda ash, limestone, or other calcium source such as burnt lime, is mixed with the binder. The binder may be either water alone or an aqueous caustic solution. Where an aqueous caustic soda solution is employed as the binder, it is generally convenient to use a 50% caustic soda solution, although any amount of sodium hydroxide can be mixed with water to form the desired binder of caustic solution. While either water or aqueous caustic solution can be used in all cases, we have found that somewhat better results are obtained when water is employed as the binder in glass batches employing burnt lime (calcium oxide) as the source of calcium values; when the batch contains calcium carbonate, whether in the form of limestone or dolomitic limestone, as the source of calcium values, we find that the aqueous caustic solution is more desirable as the binder. However, it is not intended to limit the binder that may be employed since either of these binders will yield desirable results, although for optimum results we find the above choice of binder gives best results. The binder is added to the glass batch in amounts so as not to make the batch overly wet, but in amounts sufficient to yield a subsequent briquette therefrom that has good green (unfired) strength. The binder may be added in any amounts up to about 10% with optimum amounts being between 3 and about 7.5% by weight of the batch. The binder is uniformly distributed in the glass batch by slowly adding the binder to the glass batch as it is being mixed, or by other techniques which will uniformly distribute the binder throughout the glass batch. Equipment such as ribbon blenders, tumblers, rotating drums or other blending equipment can be used to mix the batch to assure uniform distribution of the binder through the glass batch.

An important consideration in the make-up of the glass batch and binder mixture is the fact that the contents of the glass batch do not have to be specially ground, e.g., below 200 mesh, in the practice of the present invention. For example, the sand employed in the batch may range in size from about 16 mesh to −325 mesh. Such sand is essentially silicon dioxide which is necessary in glass making, as recognized by those skilled in the art, and which may be termed silicon dioxide sand. Typically, sand of 16 to 200 mesh is frequently employed in the make-up of suitable briquettes in accordance with the present invention. This is an important feature of the present process since such fine grinding of components of the glass batch is expensive and is required in many processes requiring pretreatment of the glass batch before it enters the glass furnace. It is understood that the glass batch components, such as sodium carbonate or limestone, are in a typical ground state, that is below 16 mesh, as they usually are encountered in normal glass batches fed to glass furnaces. It is not intended that the above preclude normal grinding of such components from their natural state to make them suitable as glass batch constituents.

After the glass batch and binder have been thoroughly mixed, they are allowed to remain and age for a period of at least 10 minutes; typically from 10 to 60 minutes is desired. This aging of the glass batch and binder results in increasing the green (unfired) strength of briquettes formed from the mixture in a subsequent step. This aging of the glass batch and binder can take place immediately after mixing the binder and glass batch or the aging can take place after the glass batch and binder have been compacted in a subsequent pre-briquetting stage discussed below.

In the next stage the mixture of glass batch and binder, preferably after being aged, is passed to a pre-briquetting stage during which the mixture is compacted. In this stage the mixture is passed through equipment which will compact the mixture together by compressing it. For example, the mixture can be passed between smooth rolls or run through a screw-type compactor, presses or other well known equipment used in compaction. The ultimate effect is to compress the feed by placing pressure on the batch when wetted with the binder in a confined space. For example, when small quantities of the glass batch and binder were compressed in presses, pressures of 6,000 to 7,000 psi and up for a few seconds were found most suitable.

During this stage, if the glass batch and binder have not been aged before being compacted, the compacted mass is allowed to age for at least 10 minutes, to as much as 60 minutes. As we have stated above, the compaction of the glass batch and binder in this pre-briquetting stage normally takes place with smooth rolls, a press, or screw-type compactor, such as pug mills or the like. However, it is not outside the scope of this stage of the instant process to also compact the glass batch and binder by means of a briquetting step which has the same effect as compaction by the other techniques discussed above. However, compaction by a briquetting operation is not normally desired because of the higher costs of briquetting to achieve this compaction as compared with other equivalent compacting techniques.

The product from the compaction of the glass batch and binder, whether it be in the form of a compressed sheet, extruded shape or other compacted mass, is then divided into particulate form such as by grinding or the like. In general, grinding is the preferred technique for dividing the compacted glass batch and binder into small particles having a size suitable for subsequent briquetting. Obviously, other techniques such as passing the compacted glass batch and binder through a screen or other subdividing techniques can also be used to convert the compacted batch and binder into particulate form.

The resulting particulates of glass batch and binder are then briquetted into discrete briquetted shapes. The briquetting can be carried out with a briquette press in which the material is compressed between a stationary briquette die and a movable ram with a briquetting die at its end, or on any typical briquetting equipment. The most convenient and commonly used briquetting equipment is that in which two drums which have dimpled surfaces are positioned laterally to one another and are run in opposite directions to that material which is trapped between the dimpled surfaces is compressed into briquettes. The actual pressure exerted to form the briquettes will depend on the constituents of the glass batch, the amount of binder which has been added and the size of the particulates which are being briquetted. The briquettes should be pressed with enough pressure so that they form a cohesive unit. In general, we have found that pressures of 7,000 pounds per square inch and above are adequate to prepare suitable briquettes. The size and shape of the briquettes are not critical. We have found oval briquettes having a size of 1⅞ inches long by 1¾ inches wide by ½ inch deep produced satisfactory briquettes weighing from 88-90 grams. Obviously, larger briquettes will require more pressure to form, will take longer to subsequently heat and prereact, and will melt at a slower melting rate than smaller briquettes.

An important advantage of the present invention is that briquetting such a mixture enables one to form green (unfired) briquettes of good strength to resist breakage in subsequent operations without the need to add expensive binders or other foreign matter to the glass batch which is being briquetted. The green briquettes must be of sufficient strength to withstand handling by normal conveying means used to convey them to subsequent heating stages without breakage. For example, the green briquettes must be able to withstand handling by conveyors, moving belts, bucket elevators, sliding chutes, and the like which are necessary to convey the green briquettes to the next stage of treatment. When briquettes have been formed by the procedure described above, the strength of these green briquettes is sufficiently high to withstand breakage by the required handling and transfer to the next stage of treatment.

In the next stage of the present invention the discrete briquetted shapes are then heated to temperatures of from about 750° to about 900° C. The heating can take place in any equipment which can maintain these temperatures, but it is preferred that the briquettes be heated by means which will allow quiescent heating of the briquettes without tumbling and rolling. In general, a moving grate type of furnace is more desirable than a rotary kiln, since the latter will abrade the briquettes by the constant tumbling, turning and dropping which the green briquettes will be subjected to in such equipment. Calciners, such as moving grate calciners or moving bed shaft kilns, where no agitation of the briquettes occurs during the heating stage, are ideal for this purpose since they do not subject the green briquettes to any unnecessary mechanical shocks during this heating stage. The briquetted shapes are maintained at these temperatures for a time sufficient to obtain substantial conversion of silicon dioxide values in the glass batch to silicates, e.g. sodium metasilicate. This results in substantial prereaction of the components of the glass batch so that substantial degassing (principally water and carbon dioxide) and the normally much slower conversion of silicon dioxide to silicate take place. By having substantial amounts of this prereaction take place in the briquetted shape, the rate of melting of the heated briquette in the glass furnace is thereby accelerated.

The heating of these briquetted shapes may take place for anywhere from one-half to 12 hours, depending upon the degree of reaction which is desired. The present invention contemplates reacting substantial amounts of the silicon dioxide values, preferably 50% and up to as much as 90%, in the glass batch to silicates. It is to be understood that during this heating of the briquetted shapes the conversion of the silicon dioxide values to silicates involves the passage of the silicon dioxide through a fluid state which lasts a very short time and which results on further heating to the conversion of these values to a solid state. This heating of the briquettes so as to pass some of the components of the briquette through a fluid state and thereafter upon further heating to a solid state, is imperative since sodium metasilicate or other silicates will not form unless this fluid state is reached and passed through during the heating of the briquettes.

The heat required to heat the briquetted shapes and bring about prereaction may be supplied entirely or in part from the glass furnace exhaust gases. This is achieved by carrying out the heating adjacent to a glass furnace and using the exhaust from the glass furnace to supply all or some of the heat values required for heating the briquetted shapes. For example, it has been estimated that a glass furnace operating at 2,600° F (1,430° C) has sufficient available heat to preheat and calcine briquettes at 1,560° C (850° C). In this way a substantial amount of the heat which is normally not recoverable from a glass furnace can be employed to heat the briquettes and to prereact the glass batch, in the form of briquetted shapes, before they enter the glass furnace.

After the briquetted shapes have been heated as set forth above and conversion of silicon dioxide values to silicates has been achieved, the briquettes may then be recovered as suitable feed for a glass furnace. However, since the briquetted shapes are at a temperature of 750° C to 900° C when recovered, they are ideally suited for direct addition to a glass furnace to conserve their sensible heat, required to prereact these briquetted shapes. Further, if the briquetted shapes are added to the glass furnace at 750° to 900° C, the heat requirements of the furnace are substantially reduced because a portion of the feed has been preheated, as well as prereacted.

In the practice of this invention it is intended that the partially reacted briquetted shapes be added directly to the glass furnace, while hot. However, it is within the contemplation of the process to subdivide the briquettes into smaller pieces prior to entering the glass furnace. This will enable even faster melting rates to be obtained than with the whole briquettes. However, in practice, it has not been found necessary to subdivide the briquettes, and indeed it is not desirable, because passage of the whole calcined briquettes to the glass furnace takes place smoothly without loss of any of the calcined briquettes in the transfer equipment due to breakage of the briquettes. Also, by adding the briquettes whole without subdividing them, less fines are generated in the furnace and this makes for easier operation.

In the preferred embodiment of the present invention, the hot briquetted shapes are introduced directly into a glass furnace and there reacted at a temperature no higher than 2,600° F (1,430° C) whereby the briquettes are melted and refined molten glass removed from the furnace. By operating the glass furnace at a temperature not above 2,600° F (1,430° C) and preferably in the range of 2,400° to 2,600° F (1,315° to 1,430° C) the volatilization of sodium values from the furnace is substantially decreased and polluting emissions reduced. Further, since the heat treated briquetted shapes have been prereacted, their rate of melting is sufficiently rapid to permit the glass furnace to be operated within the said range and still yield refined molten glass at the desired pull rates.

In addition to reducing the emission of sodium values from the glass furnace, the present invention permits extended life of the heat exchange units used in glass furnaces to recover some of the heat from the exiting gas stream of the furnace. In general, these heat exchangers are termed "regenerators" and are made up of a brickwork which is used to capture the heat and then release it when desired.

In general, two regenerators are used alternately with the heat from the furnace gases being retained by one regenerator, while the other regenerator gives up heat to preheat incoming air. The exiting furnace gas stream heats an initial regenerator made up of a checkerwork of bricks which it contacts before it exits from the glass furnace. At the same time air, which is necessary for the combustion of the fuel in the furnace, enters a second brick regenerator which has been heated by exiting gas previously, and is preheated before entering the furnace. The operations of the regenerators are then reversed every twenty minutes or so, so that air always enters a regenerator which has been heated previously by an exiting gas stream, while the hot furnace gases are passed into the alternate regenerator that has been cooled by preheating the air.

By preventing sodium values, whether in the form of sodium sulfate or sodium bisulfate, from being released in the hot furnace gases and precipitating and depositing on the brickwork in the regenerator, the pluggage of this brickwork can be prevented or retarded and the proper flow of either exiting gas or air which is to be preheated through the regenerator is obtained. These regenerators normally cannot be cleaned out and must be rebuilt after they have been plugged. This necessitates furnace shutdown with the loss of glass production. Accordingly, preventing the regenerators from plugging or even extending the life of these regenerators, is economically important in the operation of a glass furnace.

By virtue of the present invention, heat conservation in the operation of a glass furnace is achieved in a number of ways. Initially, the glass furnace does not have to be heated above 2,600° F (1,430° C), which temperatures are conventionally employed, to obtain current pull rates. Further, waste heat from the glass furnace can be used to heat the briquetted shapes of the present invention so that prereaction of the glass batch in the form of briquetted shapes is achieved. Such heat is normally lost to the atmosphere. Further, since the heated shapes can be fed to the glass furnace at temperatures of 750° to 900° C, the requirements of the glass furnace are reduced even further because the incoming batch (in the form of prereacted briquettes) has been substantially preheated.

In addition to the above, the life of the refractory brick liner of the glass furnace per se can also be increased by operation at materially lower temperatures, i.e., not above 2,600° F (1,430° C), compared with temperatures of 2,700° F to 2,900° F (1,480° C to 1,590° C) normally employed in the industry to obtain the desired high pull rates. While the difference may be only 100° to 300° Fahrenheit, such increases in temperatures are most significant since the brick is rapidly approaching temperatures where it loses its structural integrity and its resistance to failing. At such temperatures, operation at temperatures of 50° to 100° F lower can extend brick life by two or three times.

In referring to the temperatures in the glass furnace, it should be noted that the temperature that is actually measured is that temperature of the bridgewall in the glass furnace that normally separates the refining section from the melting section of the furnace. As is well known in the art, obtaining accurate temperatures of the glass melt per se is impossible because of the difficulty of obtaining accurate readings. Accordingly, the normal procedure is to take the temperature of the bridgewall above the surface of the melt with an optical pyrometer and this temperature is referred to as the temperature of the furnace.

The following examples are given to illustrate the invention but are not deemed to be limiting thereof.

EXAMPLE 1

To a burnt lime-containing glass batch was added 3% by weight of a 50 weight percent caustic soda in water solution as a binder. The batch contained the following essential ingredients:

|  | Weight Percent |
|---|---|
| Sand | 69.5 |
| Soda Ash | 18.7 |
| Burnt Lime | 11.2 |
| Sodium Sulfate | 0.5 |

The batch and binder were intimately mixed until the binder had uniformly been distributed in the batch. A sample of the binder and batch mixture was placed in a hardened steel die and compacted by means of a hydraulic press, either immediately or after a defined aging period, at pressures of 6,000 to 7,000 psi for a few seconds, released, removed from the die and ground for briquetting into briquetted shapes. The briquetting was carried out using a laboratory hand press to exert 6,800 psi. The first briquette from each sample was compacted as soon as was feasible after the binder was added, about 1.5 minutes. This is recorded as zero aging time. Subsequent briquettes were made from each sample at intervals of ten (10) minutes for one hour. The compression strength of the briquettes were subsequently determined by placing each briquette between two plates and exerting pressure by means of a screw mechanism until the briquette failed (Hounsfield Tensometer). The results are set forth in Table I.

TABLE I

| | BATCH AGING TIME (Minutes) | | | | | | |
|---|---|---|---|---|---|---|---|
| | 0 | 10 | 20 | 30 | 40 | 50 | 60 |
| Compression | 760 | 760 | 650 | 900 | 980 | 1,180 | 1,010 |
| Strength | 730 | 590 | 810 | 670 | 1,090 | 1,070 | 1,070 |
| (psi) | 730 | 670 | 670 | 1,350 | 1,230 | 730 | 670 |
| Average | 740 | 673 | 710 | 973 | 1,100 | 993 | 917 |

The above example illustrates the increase in briquetting strength of green, unfired briquettes with increases in aging of the batch before the compaction and briquetting stages.

EXAMPLE 2

Samples of the burnt lime-containing glass batch employed in Example 1 were mixed with ten weight percent of water as a binder. After mixing the batch and water uniformly, it was immediately compacted, by means of the hydraulic press employed in Example 1 at 6,000–7,000 psi and then stored for intervals of 0 to 5 minutes, 10–15 minutes, 20–25 minutes, and greater than 30 minutes. At the expiration of these time intervals the compacted mixtures were then ground and briquetted at 7,000 psi pressure by the briquetting hand press employed in Example 1. The resulting briquettes were then tested for compression strength using the same technique and equipment employed in Example 1.

Other samples of the burnt lime-containing glass batch were mixed with 10 weight percent water until homogeneous, stored for 0–5 minutes, and 20–25 minutes without being compacted, and then were briquetted and tested for compression strength as set forth above. The results are set forth below in Table II.

TABLE II

| Effect of Compaction on Compression Strength | | | | | |
|---|---|---|---|---|---|
| Batch Not Compacted | | Batch Compacted | | | |
| Storage Time (min.) | 0–5 | 20–25 | 0–5 | 10–15 | 20–25 | 30 |
| Compression Strength (psi) | 1,430 | 1,850 | 1,320 | 2,360 | 2,330 | 2,860 |
| | 1,630 | 1,820 | 1,460 | 2,530 | 2,500 | 2,840 |
| | 2,020 | 1,740 | 1,400 | 2,470 | 2,610 | 3,090 |
| Average | 1,693 | 1,803 | 1,393 | 2,453 | 2,480 | 2,930 |

The above example demonstrates the importance of compacting the mixture of batch and binder before it is briquetted. The results in Example 2 clearly demonstrate that when the glass batch and binder are compacted prior to briquetting, the compression strengths are materially higher than similar non-compacted briquettes. This example further demonstrates how aging of the compacted batch and binder, prior to briquetting, increases the compression strength of the green briquettes with increased aging of the binder and batch mixture in compacted form. In this example, unlike Example 1, the batch and binder mixture was aged after it was compacted.

EXAMPLE 3

Two additional samples of the glass batch employed in Example 2 were mixed with 5 and 7.5% by weight water, respectively, each was compacted as set forth in Example 2, aged for about 20 minutes, and briquetted with 7,000 psi, all as set forth in Example 2. The resulting green briquettes were then tested for their compression strengths and compared with the use of 10% water as a binder, as carried out in Example 2 under identical conditions. The results are set forth in Table 3.

Table III

| Compression Strength of Briquettes Made With Varying Amounts of Water | | | |
|---|---|---|---|
| | 5% water | 7.5% water | 10% water |
| Compression Strength (psi) | 2,700 | 3,450 | 2,330 |
| | 3,340 | 3,340 | 2,500 |
| | 3,430 | 3,760 | 2,610 |
| Average | 3,157 | 3,517 | 2,480 |

In Table III the compression strength employing 5 and 7.5% by weight water, respectively, were compared with batch containing 10% by weight water; the results employing 10% water were taken from Example 2 in which the batch was compacted and aged for 20 to 25 minutes. As will be seen from Table III, the compression strengths of the green briquettes increases with increasing amounts of water as binder and then decreases when the binder reaches 10 weight percent. This indicates that maximum compression strengths for green briquettes are obtained with at least about 7.5% water, but less than 10% by weight water. However, it should be recognized that smaller amounts of water than necessary for maximum compression strengths may be desirable in commercial operations to conserve fuel, so long as such water levels yield acceptable briquette compression strengths.

EXAMPLE 4

To a glass batch was added 3% by weight of water as a binder. The batch and binder were intimately mixed until the binder had uniformly been distributed throughout the batch. The batch contained the following essential ingredients by weight percent: sand ($SiO_2$) 64.2%, soda ash ($Na_2CO_3$) 17.3%, limestone ($CaCO_3$) 18.5%. Samples of the batch and binder were aged, compacted as set forth in Example 1, and the compacts ground and then briquetted into briquette shapes using the same technique and pressures set forth in Example 1. Aging of the batch and binder mixture was carried out for over 10 minutes. Thereafter, the resulting briquettes were calcined at 1,500° F (816° C) for 1 and 4 hours. The resulting fired briquettes, after cooling, were found to be strong, shock-resistant against breakage by normal handling, and to have their sand contents partially reacted to sodium-containing silicates. The resulting briquettes were suitable as prereacted feed to a furnace operated at 2,600° F (1,430° C), and refined glass was removed from the furnace.

Pursuant to the requirements of the patent statutes, the principle of this invention has been explained and exemplified in a manner so that it can be readily practiced by those skilled in the art, such exemplification including what is considered to represent the best embodiment of the invention. However, it should be clearly understood that, within the scope of the appended claims, the invention may be practiced by those skilled in the art, and having the benefit of this disclosure, otherwise than an specifically described and exemplified herein.

What is claimed is:
1. A process for the continuous manufacture of glass from glass batch comprising silicon dioxide, soda ash and a calcium carbonate or calcium oxide in a glass furnace comprising:
   a. adding to the glass batch a binder selected from the group consisting of water and an aqueous caustic soda solution, in amounts up to 10% by weight of the batch,
   b. aging the glass batch and binder for a period of at least 10 minutes,
   c. compacting the glass batch and binder by compressing same in a prebriquetting stage,
   d. dividing the compacted glass batch and binder into particulate form,
   e. briquetting the particulates of glass batch and binder by compressing same into discrete briquetted shapes,
   f. heating the briquetted shapes to temperatures of from about 750° C to about 900° C for a time sufficient to convert said silicon dioxide through a fluid state to a solid state to obtain substantial conversion of said silicon dioxide in the glass batch to silicates,
   g. introducing the heat-treated briquetted shapes of step (f) into a glass furnace at a temperature not above 2,600° F (1,430° C) whereby volatilization of sodium values from the furnace is reduced, and
   h. recovering refined molten glass from the furnace.
2. Process of claim 1 wherein the glass batch and binder are aged for a period of 10 minutes to 60 minutes.
3. Process of claim 1 wherein the heat-treated briquetted shapes are heated in the glass furnace at a temperature of about 2,400° to 2,600° F (1,315° to 1,430° C).

4. Process of claim 1 wherein the aging of the glass batch and binder in step (b) is carried out after it has been compacted in the prebriquetting stage (c).

5. Process of claim 1 wherein the glass batch contains silicon dioxide sand having a size from about 16 to −325 mesh.

6. Process of claim 5 wherein the silicon dioxide sand has a size of from about 16 to 200 mesh.

7. Process of claim 1 wherein the glass batch is a soda-lime glass batch.

8. Process of claim 1 wherein the glass batch contains calcium oxide and the binder is water.

9. Process of claim 1 wherein the glass batch contains calcium carbonate and the binder is an aqueous caustic soda solution.

10. Process of claim 1 wherein the briquetted shapes are heated in step (f) for a period of up to twelve hours.

11. Process of producing partially reacted, strong, shock-resistant briquetted shapes, suitable as a glass batch feed to a glass furnace comprising:
    a. adding to a glass batch comprising silicon dioxide, soda ash and a calcium carbonate or calcium oxide a binder selected from the group consisting of water and an aqueous caustic soda solution, in amounts up to 10% by weight of the batch,
    b. aging the glass batch and binder for a period of at least 10 minutes,
    c. compacting the glass batch and binder by compressing same in a prebriquetting stage,
    d. dividing the compacted glass batch and binder into particulate form,
    e. briquetting the particulates of glass batch and binder by compressing same into discrete briquetted shapes,
    f. heating the briquetted shapes to temperatures of from about 750° C to about 900° C for a time sufficient to convert said silicon dioxide through a fluid state to a solid state to obtain substantial conversion of said silicon dioxide in the glass batch to silicates, and
    g. recovering partially reacted, strong, shock-resistant briquetted shapes.

12. Process of claim 11 wherein the glass batch and binder are aged for a period of 10 minutes to 60 minutes.

13. Process of claim 11 wherein the aging of the glass batch and binder in step (b) is carried out after it has been compacted in the prebriquetting stage (c).

14. Process of claim 11 wherein the glass batch contains silicon dioxide sand having a size from about 16 to −325 mesh.

15. Process of claim 14 wherein the silicon dioxide sand has a size of from 16 to 200 mesh.

16. Process of claim 11 wherein the glass batch is a soda-lime glass batch.

17. Process of claim 11 wherein the glass batch contains calcium oxide and the binder is water.

18. Process of claim 11 wherein the glass batch contains calcium carbonate and the binder is an aqueous caustic soda solution.

19. Process of claim 11 wherein the briquetted shapes are heated in step (f) for a period of up to twelve hours.

20. A partially reacted, strong, shock-resistant briquetted shape, suitable as a glass batch feed to a glass furnace produced by:
    a. adding to a glass batch comprising silicon dioxide, soda ash and a calcium carbonate or calcium oxide a binder selected from the group consisting of water and an aqueous caustic soda solution, in amounts up to 10% by weight of the batch,
    b. aging the glass batch and binder for a period of at least 10 minutes,
    c. compacting the glass batch and binder by compressing same in a prebriquetting stage,
    d. dividing the compacted glass batch and binder into particulate form,
    e. briquetting the particulates of glass batch and binder by compressing same into a discrete briquetted shape,
    f. heating the briquetted shape to temperatures of from about 750° C to about 900° C for a time sufficient to convert said silicon dioxide through a fluid state to a solid state to obtain substantial conversion of said silicon dioxide in the glass batch to silicates, and
    g. recovering a partially reacted, strong, shock-resistant briquetted shape.

21. Process of claim 1 wherein the binder is added to the glass batch in amounts of about 3 to about 7.5% by weight of the batch.

22. Process of claim 11 wherein the binder is added to the glass batch in amounts of about 3 to about 7.5% by weight of the batch.

* * * * *

UNITED STATES PATENT OFFICE
CERTIFICATE OF CORRECTION

PATENT NO. : 4,023,976
DATED : May 17, 1977
INVENTOR(S) : William C. Bauer et al It is certified that error appears in the above-identified patent and that said Letters Patent are hereby corrected as shown below:

Column 6, line 11, "1,560°C (850°C)" should read --1,560°F (850°C)--. Column 10, line 32, "than an specifically" should read --than as specifically--.

Signed and Sealed this

Thirteenth Day of September 197

[SEAL]

Attest:

RUTH C. MASON
Attesting Officer

LUTRELLE F. PARKER
Acting Commissioner of Patents and Trademark